(12) United States Patent
Paradis

(10) Patent No.: US 7,987,014 B2
(45) Date of Patent: Jul. 26, 2011

(54) SYSTEMS AND METHODS FOR SELECTING WAFER PROCESSING ORDER FOR CYCLICAL TWO PATTERN DEFECT DETECTION

(75) Inventor: Douglas Edmund Paradis, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 741 days.

(21) Appl. No.: 12/120,881

(22) Filed: May 15, 2008

(65) Prior Publication Data

US 2009/0287338 A1 Nov. 19, 2009

(51) Int. Cl.
G06F 19/00 (2011.01)
G06F 7/00 (2006.01)
H01L 21/00 (2006.01)

(52) U.S. Cl. ........ 700/121; 700/100; 700/108; 700/112; 700/226; 438/795

(58) Field of Classification Search .................. 438/795; 700/100, 108, 112, 121, 226; 414/935, 940
See application file for complete search history.

(56) References Cited

U.S. PATENT DOCUMENTS

| | | | | |
|---|---|---|---|---|
| 4,573,851 A | * | 3/1986 | Butler | 414/404 |
| 6,074,443 A | * | 6/2000 | Venkatesh et al. | 29/25.01 |
| 6,146,077 A | * | 11/2000 | Shin et al. | 414/404 |
| 6,358,131 B1 | * | 3/2002 | Sakurai et al. | 451/287 |
| 6,684,125 B2 | * | 1/2004 | Kahn et al. | 700/218 |
| 6,947,804 B1 | * | 9/2005 | Pak et al. | 700/121 |
| 7,059,817 B2 | * | 6/2006 | Sieradzki et al. | 414/217 |
| 7,405,088 B2 | * | 7/2008 | Matsushita et al. | 438/4 |
| 2008/0183321 A1 | * | 7/2008 | Cianfrani et al. | 700/96 |
| 2008/0191723 A1 | * | 8/2008 | Osato et al. | 324/755 |

* cited by examiner

*Primary Examiner* — Ronald Hartman, Jr.
(74) *Attorney, Agent, or Firm* — Wade J. Brady, III; Frederick J. Telecky, Jr.

(57) ABSTRACT

A method of sequencing wafer processing order to minimize sequence correlation in a cyclical two pattern model by generating a set of sequences of wafer identifiers that each specify an order by which one or more fabrication equipments processes wafers of a wafer lot, where the wafer lot contains a number of slots and the fabrication equipments each includes a first subsystem for processing wafers in odd-numbered slots of the first wafer lot and a second subsystem for processing wafers in even-numbered slots of the first wafer lot, and where each of the generated wafer sequences contains exactly a number of wafer identifiers that match the wafer identifiers in every other wafer sequence indexed in the set.

20 Claims, 4 Drawing Sheets

SYSTEMS AND METHODS FOR SELECTING WAFER PROCESSING ORDER FOR CYCLICAL TWO PATTERN DEFECT DETECTION

FIELD OF THE INVENTION

This invention relates generally to wafer processing order selection, and more particularly, to systems and methods of selecting sequences of wafer processing order to increase defect detection rate by minimizing multiple cyclical two pattern correlations.

DESCRIPTION OF THE RELATED ART

In a modern semiconductor device fabrication process, the maximum rate at which semiconductor wafers can be processed and fabricated has approached a practical limit, and thus the yield of good semiconductor devices per wafer is a key determinant of profitability. Presently, yield loss per wafer due to defects and faults typically ranges from a few percent to several tens of percent of the semiconductor devices formed from the wafer, resulting in a significant fraction of the semiconductor devices being discarded.

A key element in improving wafer yield is fault analysis. During the device fabrication process, there are numerous processing steps and equipments that can cause yield loss, and therefore it is not necessarily obvious which processing steps and equipments are performing optimally and which are not. Shuffling and/or randomizing wafer processing order before critical processing steps, and performing multidimensional correlation and filtering operations on the randomized wafer processing order, provide useful information for determining faulty equipments during fault isolation analysis.

However, randomizing or shuffling the wafer processing order often results in chance correlation between two or more sequences of wafer processing order. Correlated sequences negate the benefit of randomizing wafer processing order during the fabrication process because different processing steps will appear to be correlated to a given yield excursion signature. In the view of the foregoing, there is a need for methods and systems for selecting sequences of wafer processing order that increases defect detection rate by minimizing multiple sequence correlations.

SUMMARY OF THE INVENTION

According to various embodiments, a method is provided for sequencing wafer processing order to minimize sequence correlation in a cyclical two pattern model. The method includes the steps of generating a first sequence of wafer identifiers for specifying an order by which a first equipment processes wafers of a first wafer lot, where the first wafer lot has a predetermined number of slots and the first equipment includes a first subsystem for processing wafers in odd-numbered slots of the first wafer lot and a second subsystem for processing wafers in even-numbered slots of the first wafer lot, and indexing the first sequence into a set of sequences, where the set contains sequences of wafer identifiers for select slots selected from one of the even-numbered slots and the odd-numbered slots. The method further includes the steps of generating and indexing one or more downstream sequences of the wafer identifiers for specifying an order by which to process the wafers of the first wafer lot in one or more corresponding equipments downstream from the first equipment, where each of the generated sequences contains exactly a required number of wafer identifiers that match the wafer identifiers in every sequence previously indexed in the set, and processing the first wafer lot in one of the first and second subsystems of the first equipment in an order based on a first sequence indexed in the set of sequences.

Consistent with another embodiment of the present invention, a system is provided for sequencing wafer processing order to minimize sequence correlation in a cyclical two pattern model. The system includes a communication channel configured to provide communication services and a wafer sequence generator coupled to the communication channel and configured to: generate a first sequence of wafer identifiers for specifying an order by which a first equipment processes wafers of a first wafer lot, where the first wafer lot has a predetermined number of slots and the first equipment includes a first subsystem for processing wafers in odd-numbered slots of the first wafer lot and a second subsystem for processing wafers in even-numbered slots of the first wafer lot, and index the first sequence into a set of sequences, where the set contains sequences of wafer identifiers for select slots selected from one of the even-numbered slots and the odd-numbered slots. The wafer sequence generator may be further configured to: generate and index one or more downstream sequences of the wafer identifiers for specifying an order by which to process the wafers of the first wafer lot in one or more corresponding equipments downstream from the first equipment, where each of the generated sequences contains exactly a required number of wafer identifiers that match the wafer identifiers in every sequence previously indexed in the set, and process the first wafer lot in one of the first and second subsystems of the first equipment in an order based on a first sequence indexed in the set of sequences. The system also includes a wafer processing unit coupled to the communication channel, wherein the wafer processing unit is configured to process the first wafer lot in one of the first and second subsystems of the first equipment in an order based on a first sequence indexed in the set of sequences.

Additional embodiments will be set forth in part in the description which follows, and in part will be obvious from the description, or may be learned by practice of the disclosed embodiments. Embodiments will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION

Reference will now be made in detail to the exemplary embodiments, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which may be practiced. These embodiments are described in sufficient detail to enable those skilled in the art to practice these embodiments and it is to be understood that other embodiments may be utilized and that changes may be made without departing from the scope of the invention. The following description is, therefore, merely exemplary.

Notwithstanding that the numerical ranges and parameters setting forth the broad scope of the exemplary embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Figure 1:
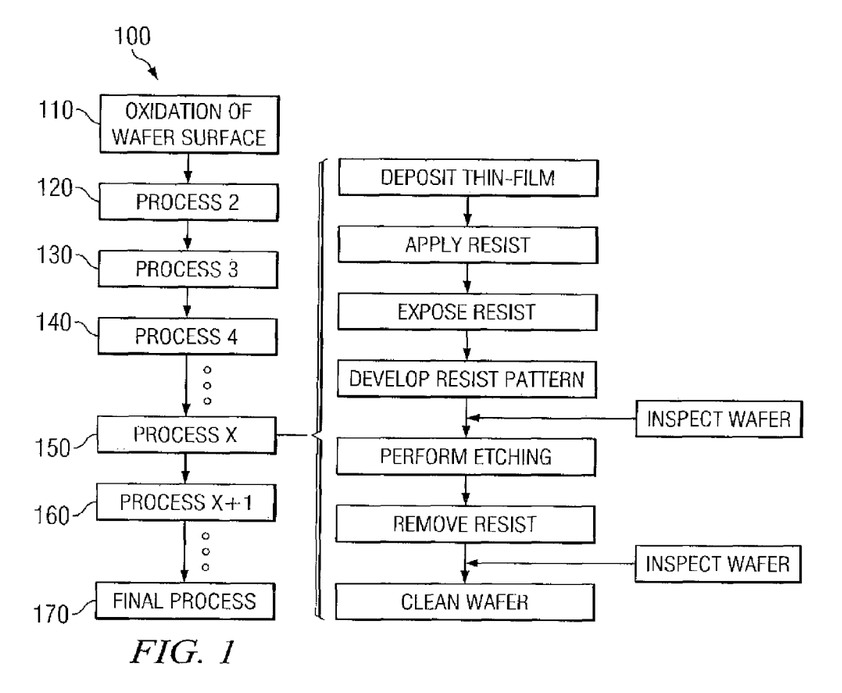
FIG. 1 illustrates an exemplary process flow of layer forming processes for fabricating a semiconductor device in accordance with various embodiments of the invention.

FIG. 1 is a diagram of an exemplary process flow 100 of layer forming processes 110-170 for fabricating a semiconductor device in accordance with various embodiments. The semiconductor device may include a wafer fabricated using process flow 100, beginning with a layer forming process 110 of coating the surface of the wafer with oxide film and continuing through numerous layer forming processes ranging from a layer forming process 120 to a final layer forming process 170, which are iterated as necessary to form layers of the semiconductor device. Each of layer forming processes 110-170 essentially corresponds to one layer and typically includes the following sub-processes: deposit a conductive thin-film and/or an insulation thin-film using a deposition equipment such as a sputtering deposition equipment or chemical vapor deposition equipment; apply resist film to the deposited conductive thin-film and/or insulation thin-film using a resist application equipment, expose the resist to light that passes through a circuit pattern mask using a stepper, an excimer laser exposure equipment, or the like; develop the circuit pattern transferred onto the resist film; etching the conductive thin-film and/or insulation thin-film according to the resist circuit pattern using an etching equipment to forming the circuit pattern on the thin-films; remove the remaining resist; and cleaning the surface of the wafer.

The wafer thus processed may be inspected after one or more layer forming processes 110-170 and/or sub-processes therein. For example, after the wafer is processed by the sub-process for developing resist pattern, a critical dimensions measuring equipment may be used to sample and inspect the partially fabricated wafer to confirm that the circuit pattern has been properly transferred onto the resist, and after the wafer is processed by the sub-process for removing resist, a pattern inspection equipment may be used to sample and inspect the wafer for defects such as short-circuits and breaks in the circuit pattern formed in the conductive thin-film and insulation thin-film. One of ordinary skill in the art will appreciate that additional processes and sub-processes may be added to process flow 100, and layer forming processes 110-170 in process flow 100 and their corresponding sub-processes may be removed, rearranged, and/or modified as needed to fabricate and process the wafer in the semiconductor device.

Figure 2:
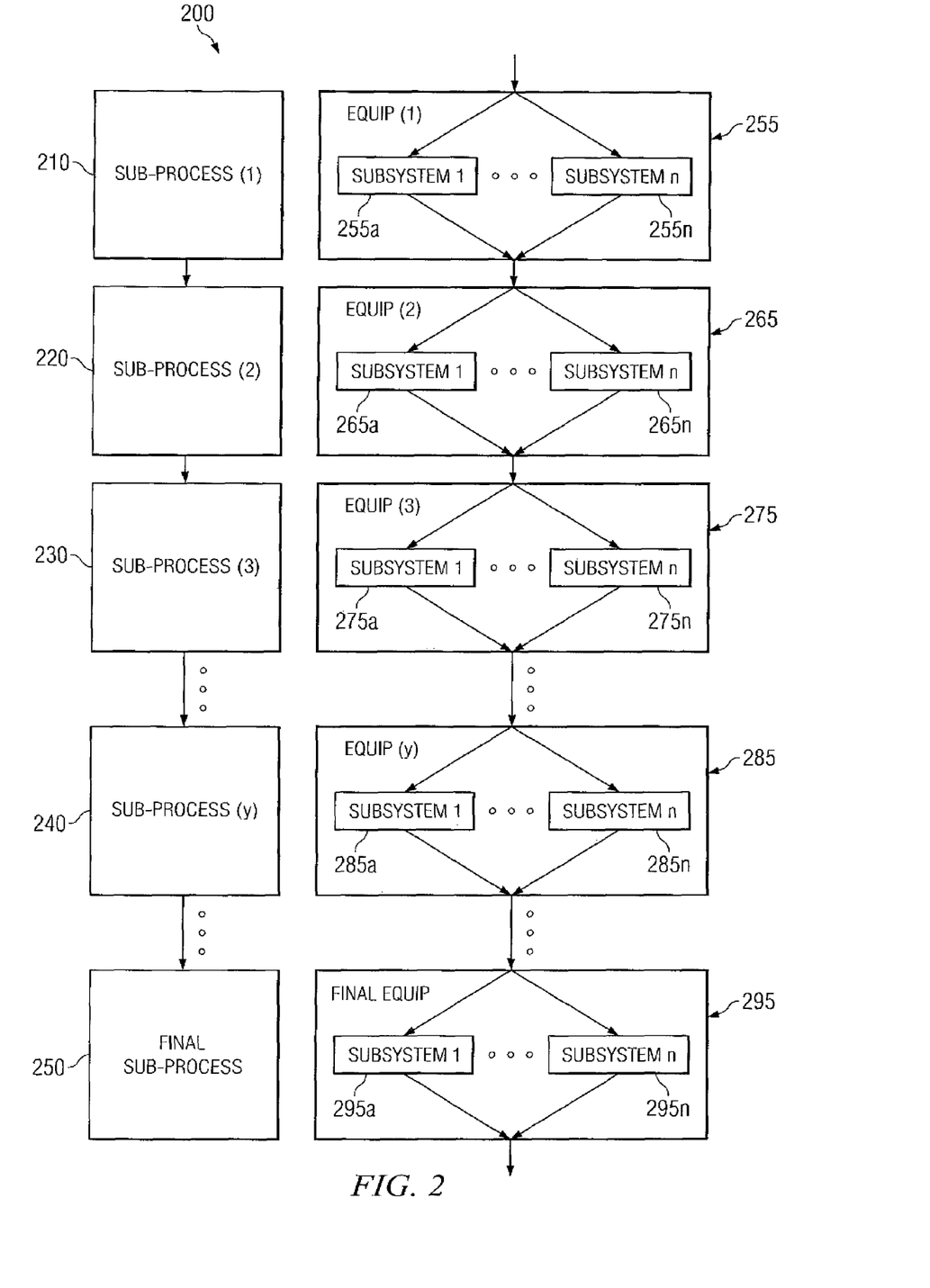
FIG. 2 illustrates an exemplary process flow of sub-processes in one of the device fabrication processes of FIG. 1 in accordance with various embodiments of the invention.

FIG. 2 is a diagram illustrating an exemplary sub-process flow 200 of sub-processes 210-250 included in one of layer forming processes 110-170 as shown in FIG. 1. During fabrication sub-processes 210-250, the wafer may be processed (e.g., fabricated) using fabrication equipments 255-295, each having multiple subsystems (e.g., chambers) for processing wafers, and may each correspond to one or more of sub-processes 210-250 as shown in FIG. 2. For example, the wafer may be processed in a first sub-process 210 using one of subsystems 255a-n in a first fabrication equipment 255, and in a second sub-process 220 using one of subsystems 265a-n in a second fabrication equipment 265 downstream from first fabrication equipment 255. The wafer may be further processed in a third sub-process 230 using one of subsystems 275a-n in a third fabrication equipment 275 downstream from fabrication equipments 255 and 265, and in a y-th sub-process 240 using one of subsystems 285a-n in a y-th fabrication equipment 285 downstream from fabrication equipments 255-275. In a final sub-process 250, the wafer may be processed using one of subsystems 295a-n in a final fabrication equipment 295 downstream from fabrication equipments 255-285. One of ordinary skill in the art will appreciate that additional sub-processes and corresponding fabrication equipments may be added to sub-process flow 200, and sub-processes 210-250 in sub-process flow 200 and their corresponding fabrication equipments 255-295 may be removed, rearranged, and/or modified as needed to form the layers of the wafer in the semiconductor device.

In an exemplary embodiment, one or more inspection equipments may be used to inspect the wafer after any one of sub-processes 210-250 to determine if one or more of fabrication equipments 255-295 are faulty and/or causing defects in the wafer. For example, if an inspection equipment (not shown) inspects the partially fabricated wafer immediately after third equipment 275 fabricates the wafer in third sub-process 230, the source of a defect in the wafer detected by the inspection is regarded as lying in any of the upstream fabrication equipments (e.g., fabrication equipments 255-275) involved in the fabrication of the wafer. If any of the upstream fabrication equipments or subsystems therein is faulty or not performing optimally, the same defect may occur in other wafers fabricated with the same upstream fabrication equipment or subsystem therein that is causing the defect. Therefore, to reduce defects in fabricated wafers and to maximize wafer yield, when a defect is found on a wafer, it is important to identify which of the upstream fabrication equipments caused the wafer defect as soon as possible and take remedial action for the faulty equipment or the subsystem therein.

Figure 3:
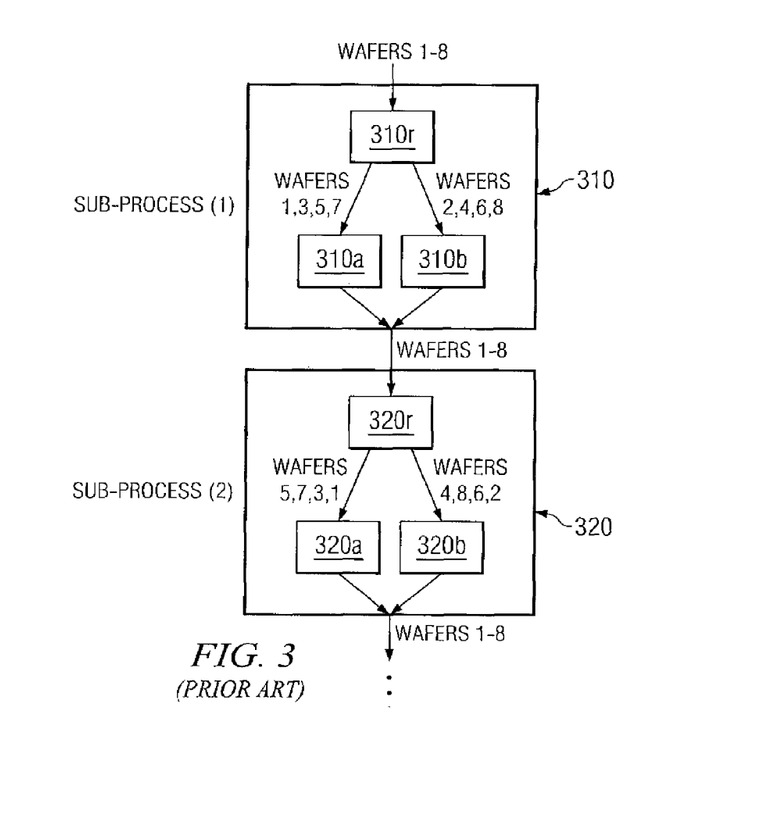
FIG. 3 illustrates an existing device fabrication process flow that randomly reorders semiconductor wafers into multiple correlated sequences for wafer processing during device fabrication.

FIG. 3 illustrates an existing device fabrication process flow that randomly reorders semiconductor wafers as they pass through the fabrication equipments during device fabrication. The existing practice of randomizing wafer processing order before critical processing steps, and performing multidimensional correlation and filtering operations on the randomized wafer processing order, provides useful information for determining faulty equipments based on a yield excursion signature during fault isolation analysis. However, randomizing the wafer processing order often results in chance correlation between two or more sequences of wafer processing order. Multiple correlated sequences negate the benefit of randomizing wafer processing order during the fabrication process because different processing steps performed by different fabrication equipments will appear to be correlated to a given yield excursion signature, which renders identifying the faulty fabrication equipment or subsystem therein based on the yield excursion signature difficult.

For example, in FIG. 3 7 wafers in a lot of eight are randomized into multiple correlated sequences in a cyclical two pattern model. Cyclical two pattern model, which is defined as "every other wafer bad," is an important wafer processing order pattern model for fault isolation analysis and typically involves dividing wafers in a lot into even and odd slots. When the wafer lot enters a first fabrication equipment 310, a randomizer 310r randomly reorders the wafers and sends wafers 1, 3, 5, and 7 to a first subsystem 310a and wafers 2, 4, 6, and 8 to a second subsystem 310b. Next, the wafer lot exits first fabrication equipment 310 and enters a second fabrication equipment 320, and a randomizer 320r randomly reorders the wafers and sends wafers 5, 7, 3, and 1 to a first subsystem 320a and wafers 4, 8, 6, and 2 to a second subsystem 320b. After the wafer lot exits second fabrication equipment 320, a wafer inspection equipment (not shown) inspects the wafer lot for defects and faults. If the wafer inspection equipment determines that wafers 1, 3, 5, and 7 are defective, there is no way to determine whether first subsystem 310a in first fabrication equipment 310 and/or first subsystem 320a in second fabrication equipment 320 is faulty because the sequences of wafer processing order through first fabrication equipment 310 and second fabrication equipment 320 are correlated.

Figure 4:
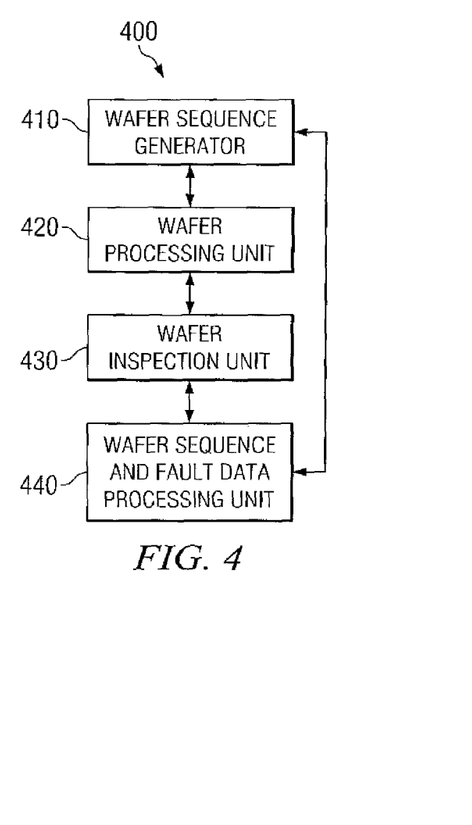
FIG. 4 illustrates a simplified block diagram of an exemplary system for selecting wafer processing order sequences to improve wafer defect detection according to various embodiments of the invention.

FIG. 4 illustrates a simplified block diagram of an exemplary semiconductor fabrication line management system 400 configured to improve wafer defect detection by generating and applying wafer processing order sequences (henceforth "wafer sequences") that minimize the occurrence of multiple correlated sequences. A wafer sequence specifies an order by which a fabrication equipment processes (e.g., fabricates) the wafers in a wafer lot. If the fabrication equipment includes multiple subsystems (e.g., a multi-chamber fabrication equipment), the wafer sequence may further specify which of the subsystems processes the wafers in the wafer lot. System 400 illustrates the general structure of a semiconductor fabrication line management system in accordance with various embodiments, and one of ordinary skill in the art will appreciate that system 400 may include standalone components and/or components integrated into one or more semiconductor fabrication systems.

Figure 5:
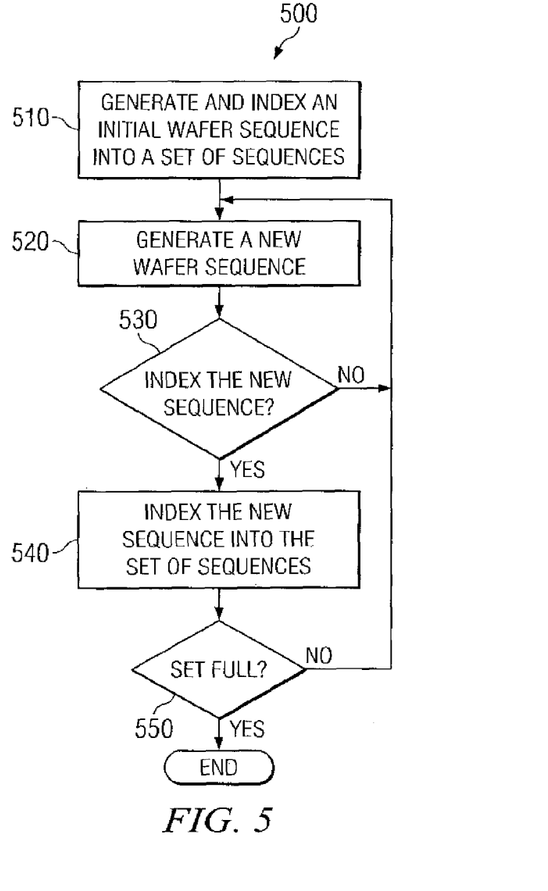
FIG. 5 is a flowchart outlining an exemplary flow diagram for generating a set of wafer processing order sequences for improving wafer defect detection according to various embodiments of the invention.
Figure 6:
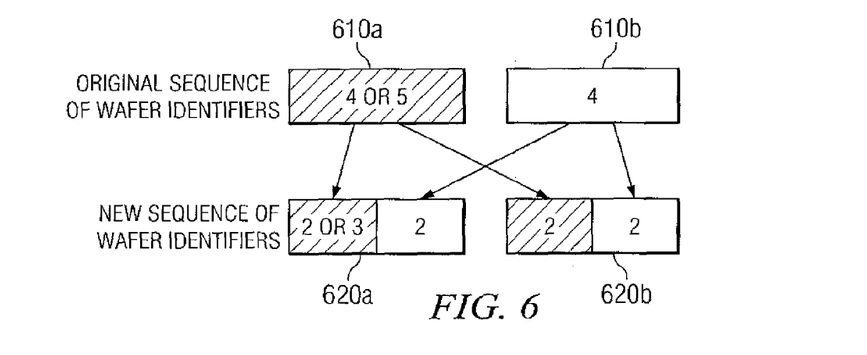
FIG. 6 shows an exemplary strategy for generating a new sequence of wafer identifiers that specifies an order in which to process wafers in a wafer lot according to various embodiments of the invention.

As shown in FIG. 4, semiconductor fabrication line management system 400 includes a wafer sequence generator 410, a wafer processing unit 420, a wafer inspection unit 430, and a wafer sequence and fault data processing unit 440. Wafer sequence generator 410 generates and stores wafer sequences, as illustrated in FIGS. 5 and 6 and described in greater detail infra, and provides the wafer sequences to wafer processing unit 420 and fault data processing unit 440 via a communication channel including, for example, a direct connection, a network (not shown), recording media (not shown), and the like. Wafer sequence generator 410 may also collect equipment data that includes the configuration and history of the fabrication equipments in wafer processing unit 420 and fault data from fault data processing unit 440.

Wafer processing unit 420 fabricates the semiconductor devices by processing wafers using fabrication equipments (e.g., fabrication equipments 255-295 as shown in FIG. 2) that may each have multiple subsystems (e.g., chambers) for processing the wafers, and the fabrication equipments may each correspond to one or more sub-processes (e.g., sub-processes 210-250 as shown in FIG. 2). In various embodiments, wafer processing unit 420 receives the wafer sequences from wafer sequence generator 410, and processes the wafers according to the wafer sequences. Wafer processing unit 420 may include wafer loaders that have pick and place capability, and thus are capable of picking a wafer from any one of the slots of an incoming wafer lot for processing by a specified subsystem of a fabrication equipment, and placing wafers from a fabrication equipment onto any of the unoccupied slots in an outgoing wafer lot. Wafer processing unit 420 may also include wafer loaders that do not have pick and place capability and instead sequentially accesses the wafers, and thus may utilize a wafer staging area to shuffle the wafers before loading the wafers for processing by the specified subsystem of the fabrication equipment.

As the fabrication equipments of wafer processing unit 420 process and fabricate the wafers, the wafers may also be inspected by wafer inspection unit 430. For example, after one of the fabrication equipments develops the resist pattern on a partially fabricated wafer, a critical dimensions measuring equipment downstream from the fabrication equipment may be used to sample and inspect the partially fabricated wafer to confirm that the circuit pattern has been properly transferred onto the resist. For another example, after one of the fabrication equipments removes the resist from the partially fabricated wafer, a pattern inspection equipment downstream from the fabrication equipment may be used to sample and inspect the wafer for defects such as short-circuits and breaks in the circuit pattern formed in the wafer's conductive thin-film. One of ordinary skill in the art will appreciate that wafer inspection unit 430 may incorporate any number and types of inspection equipment, and may be a standalone component in system 400 or an integral part of wafer processing unit 420.

In an exemplary embodiment, wafer inspection unit 430 may capture the wafers' identification numbers and slot positional data in their associated wafer lot as the wafer loaders transport the wafers for processing by the fabrication equipments of wafer processing unit 420 at various points during fabrication. Each of the wafers in the wafer lot is associated with a wafer identification number (henceforth "wafer ID") and may be uniquely identified in the wafer lot by its wafer ID. Capturing the wafers' ID and their slot position relative to other wafers in the wafer lot allows system 400 to track the wafers' processing order and to ensure that the wafers are processed in the subsystem of the fabrication equipment specified by the wafer sequences generated by wafer sequence generator 410. Wafer ID tracking may be accomplished by using computer readable means, such as scanners and bar codes on the wafers, charge-coupled device-based readers and optical character recognition, and the like. As wafer inspection unit 430 inspects the wafers during wafer processing, wafer inspection unit 430 may provide the wafer inspection results and the wafer tracking data to fault data processing unit 440.

Fault data processing unit 440 may generate wafer defect data based on the wafer inspection results, and perform a fault isolation analysis based on the wafer defect data and the wafer sequences to isolate one or more faulty fabrication equipments or subsystems therein that caused the wafer defect. In an exemplary embodiment, fault data processing unit 440 may isolate the wafer defect to the faulty fabrication equipment(s) or subsystem(s) therein based on the wafer inspection results received from wafer inspection unit 430 and the wafer sequences received from wafer sequence generator 410. In another exemplary embodiment, fault data processing unit 440 may isolate the wafer defect to the faulty fabrication equipment(s) or subsystem(s) therein based on the inspection results and the wafer tracking data received from wafer inspection unit 430.

Figure 7:
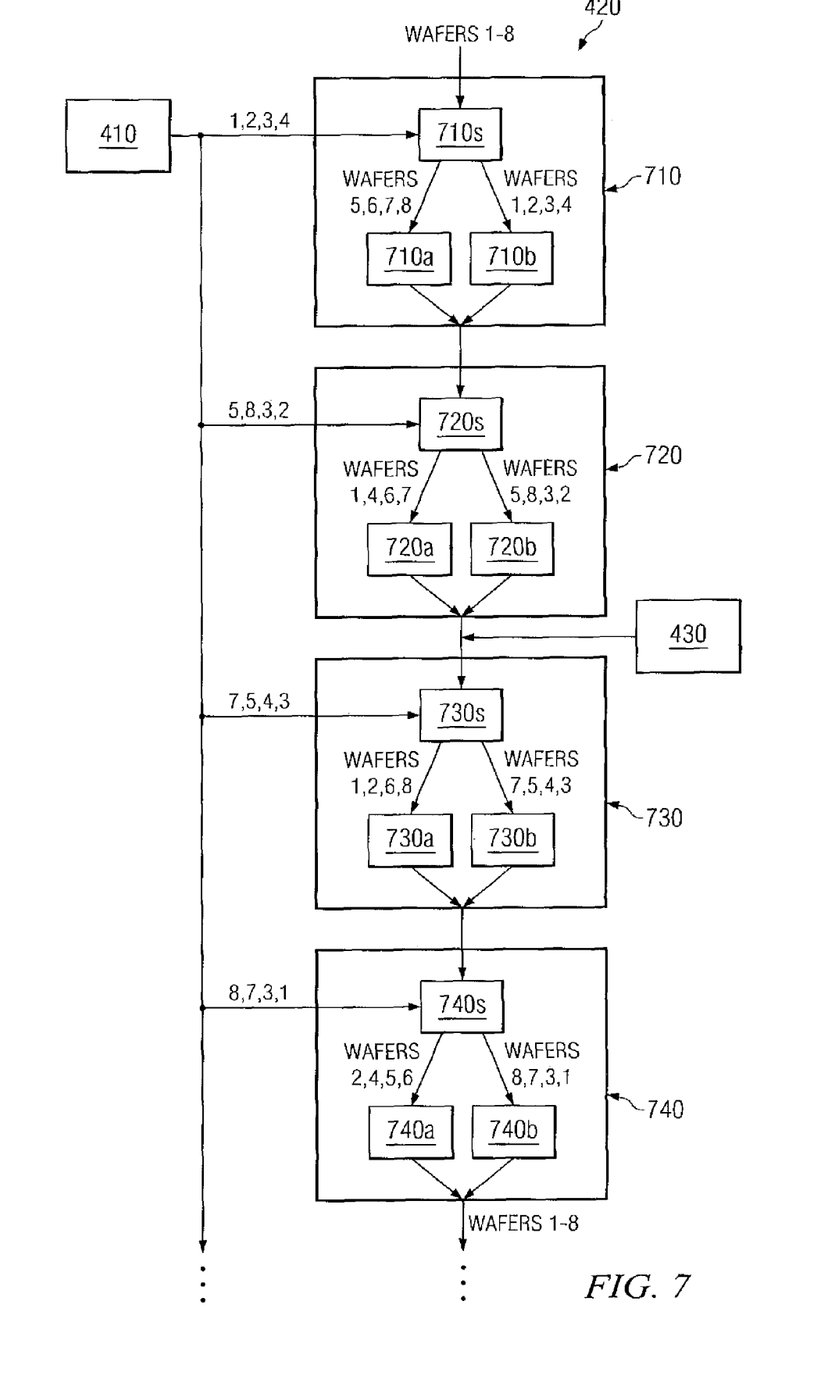
FIG. 7 illustrates a partial block diagram of an exemplary system processing wafers according to a set of wafer sequences generated in accordance with various embodiments of the invention.

Fault data processing unit 440 may generate fault data by isolating wafer defects to the faulty fabrication equipment(s) or subsystem(s) therein based on the wafer sequence data, an example of which is illustrated in FIG. 7 and described in greater detail infra, by performing multidimensional correlation and filtering operations on the wafer sequences and the wafer inspection results or the wafer defect data generated from the wafer inspection results. In an exemplary embodiment, fault data processing unit 440 provides the fault data to engineers or technicians to enable them to quickly address problems and stop any faulty fabrication equipment(s) or subsystem(s) therein from producing more defective wafers. Fault data processing unit 440 may also direct wafer processing unit 420 to stop the faulty fabrication equipment(s) or subsystem(s) therein and divert the wafers to other fabrication equipments or subsystems therein that are not faulty.

One of ordinary skill in the art will appreciate that wafer sequence generator 410 and fault data processing unit 440 may be embodied in various forms including, for example, a data processor (e.g., a computer that includes a database), hardware, firmware, software, or combinations thereof. In software embodiments, the components of wafer sequence generator 410 and fault data processing unit 440 may be implemented using computer languages such as C, C++, object-oriented programming languages, or other programming languages. In hardware and firmware embodiments, the components may be implemented using a processor, microcontroller, an application specific integrated circuit, EEPROM, or other programmable devices. Further, while certain exemplary systems are described herein, it will be appreciated that the order and arrangement of the units and components of the systems may be substituted, modified, combined or otherwise altered.

FIG. 5 is a flowchart outlining an exemplary flow diagram 500, performed by wafer sequence generator 410, for generating a set of wafer sequences for improving wafer defect detection in accordance with various embodiments. One of ordinary skill in the art will appreciate that flow diagram 500 depicted in FIG. 5 represents a generalized schematic illustration and that other steps may be added or existing steps may be removed or modified.

As shown in step 510, wafer sequence generator 410 may be configured to start generating a new set of wafer sequences by generating an initial wafer sequence and indexing the initial wafer sequence into the new set of wafer sequences. The initial wafer sequence contains wafer IDs of some or all of the wafers in a wafer lot and specifies an order by which a first fabrication equipment processes the wafers. In accordance with various embodiments, wafer sequence generator 410 may generate the initial wafer sequence based on the cyclical two pattern model for the first fabrication equipment that has two subsystems (e.g., a dual-chamber fabrication equipment).

Depending on a sequencing scheme, the initial wafer sequence based on the cyclical two pattern model may contain a sequence of wafer IDs of the wafers specified to be in either the even slots or the odd slots of the wafer lot, and thus the first fabrication equipment may process the wafers corresponding to the wafer IDs in the initial wafer sequence in one of the subsystems and fabricate the remaining wafers in the wafer lot in the other subsystem. For example, an exemplary sequencing scheme for the cyclical two pattern model may specify that each of the wafer sequences in the set contains a sequence of wafer IDs for even slots only, for odd slots only, or for all slots. If the wafer sequence contains a sequence of wafer IDs for even slots only, then the size of the wafer sequence is equal to the number of even slots. Likewise, if the wafer sequence contains a sequence of wafer IDs for odd slots only, then the size of the wafer sequence is equal to the number of odd slots, and if the wafer sequence contains a sequence of wafer IDs for all slots, then the size of the wafer sequence is equal to the size of the wafer lot. After generating the initial wafer sequence, wafer sequence generator 410 may index the initial wafer sequence into an empty set of wafer sequences. One of ordinary skill in the art will appreciate that various cyclical and linear pattern models may be used and/or combined with the cyclical two pattern model in a manner consistent with various embodiments of the invention, and that the wafer sequences may be modified and/or adapted in accordance with the various cyclical and linear pattern models.

In step 520, wafer sequence generator 410 may be configured to generate a new wafer sequence. Wafer sequence generator 410 may generate the new wafer sequence based on a sequencing strategy, for example, as illustrated in FIG. 6, which depicts an exemplary strategy for generating a new wafer sequence in the cyclical two pattern model in accordance with various embodiments. For illustration purposes, FIG. 6 depicts an exemplary embodiment in which the wafer lot size is eight or nine wafers, but various embodiments of the invention are not limited to a specific wafer lot size.

As shown in FIG. 6, a new wafer sequence having odd slots 620a and even slots 620b is generated based on an original wafer sequence having odd slots 610a and even slots 610b. The original wafer sequence may be the wafer sequence last indexed into the set or any one of the wafer sequences already indexed into the set. For instance, if there are three wafer sequences indexed in the wafer sequence set, then the new wafer sequence may be generated based on the last indexed wafer sequence (i.e., the third wafer sequence in the set) or any one of the indexed wafer sequences. For another instance, if the only wafer sequence indexed in the wafer sequence set is the initial wafer sequence generated in step 510, then the new wafer sequence may be generated based on the initial wafer sequence.

Furthermore, depending on the sequencing scheme, the original wafer sequence may contain a sequence of wafer IDs for either even slots only or odd slots only, and thus the remaining wafers may be inferred. In an exemplary embodiment, the original wafer sequence may contain only wafer IDs in even slots 610b, thus wafer sequence generator 410 may infer the wafer IDs in odd slots 610a before generating the new wafer sequence. Wafer sequence generator 410 may generate the new wafer sequence by exchanging up to half of the wafer IDs from the original sequence's even slots 610b with an equal number of wafer IDs from odd slots 610a. One of ordinary skill in the art will appreciate that the new wafer sequence may be generated based on various sequencing strategies in accordance with various embodiments of the invention.

Returning to FIG. 5, in step 530, wafer sequence generator 410 may be configured to determine whether or not the new wafer sequence satisfies one or more indexing criteria prior to indexing the new wafer sequence into the wafer sequence set. In various embodiments, one of the indexing criteria may be based on a degree of match between the new wafer sequence and the indexed wafer sequences in the wafer sequence set. For example, prior to indexing the new wafer sequence into the wafer sequence set, wafer sequence generator 410 may require that the new wafer sequence contains exactly a number of wafer IDs that match the wafer IDs in each of the indexed wafer sequences. The number of wafer IDs matched per sequence may be calculated based on the wafer lot size and/or the wafer sequence size, examples of which are shown in Table 1.

Table 1 illustrates the number of possible wafer sequences per set based on the wafer lot size and the number of wafer IDs matched per wafer sequence in an exemplary embodiment where the sequencing scheme specifies that the wafer sequences store wafer IDs for the even slots only. In various embodiments, the number of wafer IDs matched in each of the wafer sequences may be set to half of the wafer sequence size, which optimizes the independence between the wafer sequences and reduces the possibility of chance correlation between the wafer sequences to less than four percent in the cyclical two pattern model. The number of wafer IDs matched per wafer sequence may be lowered to increase the number of possible wafer sequences, albeit at a cost of increased multiple sequence correlations.

TABLE 1

Number of Possible Wafer Sequences as a Function of the Wafer Lot Size and the Number of Wafer IDs that Match in Each of the Sequences

| Wafer Lot Size | Number of Even Slots (Wafer Sequence Size) | Number of Wafer IDs Matched per Wafer Sequence | Maximum Number of Possible Wafer Sequences |
|---|---|---|---|
| 4 | 2 | 1 | 3 |
| 8 | 4 | 2 | 7 |
| 12 | 6 | 3 | 11 |
| 16 | 8 | 4 | 15 |
| 20 | 10 | 5 | 19 |
| 24 | 12 | 6 | 23 |

If wafer sequence generator 410 determines in step 530 that the new wafer sequence does not satisfy the indexing criteria, then wafer sequence generator 410 may return to step 520 to generate another new sequence. Otherwise, if wafer sequence generator 410 determines in step 530 that the new wafer sequence satisfies the indexing criteria, then in step 540, wafer sequence generator 410 may index the new wafer sequence into the wafer sequence set before proceeding onto step 550.

In step 550, wafer sequence generator 410 may be configured to determine whether or not the wafer sequence set is full. In various embodiments, the wafer sequence set may be considered full once it has indexed a maximum number of wafer sequences. The maximum number of wafer sequences may be calculated based on the wafer lot size and the number of wafer IDs matched per wafer sequence, examples of which are illustrated in Table 1. The wafer sequence set may also be considered full once it has indexed a sufficient number of wafer sequences for the fabrication equipments in wafer processing unit 420. If wafer sequence generator 410 determines in step 550 that the wafer sequence set is not full, then wafer sequence generator 410 returns to step 520 to generate another new sequence. Otherwise, if wafer sequence generator 410 determines in step 550 that the wafer sequence set is full, then in step 550, wafer sequence generator 410 terminates wafer sequence set generation.

In accordance with various embodiments, wafer sequence generator 410 may repeat the steps outlined in flow diagram 500 to generate multiple sets of wafer sequences for processing wafer lots by wafer processing unit 420. For example, the fabrication equipments in wafer processing unit 420 may cycle through different sets of wafer sequences as multiple wafer lots pass through the fabrication equipments to minimize chance correlation between multiple sequences in non-cyclical two pattern models.

Table 2 illustrates an exemplary wafer sequence set generated by wafer sequence generator 410 performing the steps outlined in flow diagram 500 of FIG. 5. The exemplary wafer sequence set is generated for a wafer lot having eight wafers and according to a sequencing strategy for the cyclical two pattern model as shown in FIG. 6 and a sequencing scheme that specifies the wafer sequences to store wafer IDs for the even slots only. As shown in Table 2, the wafer sequences in the exemplary set contain two wafer IDs matched per wafer sequence. One of ordinary skill in the art will appreciate that the wafer sequence set illustrated in Table 2 is exemplary and that wafer sequence sets having various wafer sequences indexed therein may be generated using flow diagram 500 outlined in FIG. 5.

TABLE 2

An Exemplary Wafer Sequence Set

| Wafer Sequence Number | Slot 2 | Slot 4 | Slot 6 | Slot 8 |
|---|---|---|---|---|
| 1 | 1 | 2 | 3 | 4 |
| 2 | 5 | 8 | 3 | 2 |
| 3 | 7 | 5 | 4 | 3 |
| 4 | 8 | 7 | 3 | 1 |
| 5 | 8 | 5 | 1 | 4 |
| 6 | 6 | 8 | 4 | 3 |
| 7 | 8 | 7 | 2 | 4 |

FIG. 7 illustrates a partial block diagram of a semiconductor fabrication line management system (e.g., system 400 as shown in FIG. 4) processing wafers in an order specified by the wafer sequences in the exemplary wafer sequence set illustrated in Table 2. In FIG. 7, wafers in a lot of eight are processed by fabrication equipments 710-740 of wafer processing unit 420, where each of fabrication equipments 710-740 includes a wafer loader and two subsystems (e.g., chambers). Because the wafer sequences in the exemplary wafer sequence set contain wafer IDs for even slots only, the wafer IDs in odd slots are inferred. In various embodiments, the inferred wafer IDs in odd slots may be shuffled and/or randomized to minimize specific correlations between the wafer sequences in pattern models other than the cyclical two pattern model. One of ordinary skill in the art will appreciate that the wafer lot size and the sequencing strategy and scheme illustrated in FIG. 7 are exemplary and that various sequencing strategies and schemes may be used in a manner consistent with various embodiments to improve wafer defect detection during fabrication of wafers in wafer lots of various sizes.

When the wafer lot enters a first fabrication equipment 710, a wafer loader 710s shuffles the wafers according to wafer sequence 1 (as shown in Table 2) provided by wafer sequence generator 410 and sends wafers 5, 6, 7, and 8 to a first subsystem 710a and wafers 1, 2, 3, and 4 to a second subsystem 710b. Next, the wafer lot exits first fabrication equipment 710 and enters a second fabrication equipment 720, where a wafer loader 720s shuffles the wafers according to wafer sequence 2 provided by wafer sequence generator 410 and sends wafers 1, 4, 6, and 7 to a first subsystem 720a and wafers 5, 8, 3, and 2 to a second subsystem 720b.

After the wafer lot exits second fabrication equipment 720, a wafer inspection unit (e.g., wafer inspection unit 430 as shown in FIG. 4) may inspect the wafer lot for defects, and provides the inspection result to a wafer sequence and fault data processing unit (e.g., fault data processing unit 440 as shown in FIG. 4). If the wafer inspection unit detects defects in the wafers, the fault data processing unit may be configured to generate fault data for the upstream fabrication equipment(s) (e.g., fabrication equipments 710 and 720) or subsystem(s) therein (e.g., subsystems 710a-b and 720a-b), by performing multidimensional correlation and filtering operations on the wafer sequences and the wafer inspection results or the wafer defect data generated from the wafer inspection results. Table 3 illustrates exemplary fault data generated by fault data processing unit 430 based on the inspection result and the wafer sequences in the exemplary set.

TABLE 3

Exemplary Fault Data

| Defective Wafers | Faulty Fabrication Subsystem |
|---|---|
| 1, 2, 3, 4 | Subsystem 710b |
| 5, 6, 7, 8 | Subsystem 710a |
| 2, 3, 5, 8 | Subsystem 720b |
| 1, 4, 6, 7 | Subsystem 720a |
| 1, 2, 3, 4, 5, 8 | Subsystems 710b and 720b |
| 2, 3, 5, 6, 7, 8 | Subsystems 710a and 720b |
| 1, 4, 5, 6, 7, 8 | Subsystems 710a and 720a |
| 1, 2, 3, 4, 6, 7 | Subsystems 710b and 720a |

If fault data is generated, the fault data processing unit may provide the fault data to engineers or technicians to enable them to quickly address problems and stop the faulty fabrication equipment(s) or subsystem(s) therein. The fault data processing unit may also direct wafer processing unit 420 to stop the faulty fabrication equipment(s) or subsystem(s) therein and divert the wafers to other fabrication equipments or subsystems therein that are not faulty.

If no fault data is generated and/or wafer processing unit 420 is directed to continue wafer processing, the wafer lot may then proceed to additional fabrication equipments for further processing. For example, the wafer lot may enter a third fabrication equipment 730, where a wafer loader 730s shuffles the wafers according to wafer sequence 3 and sends wafers 7, 5, 4, and 3 to a first subsystem 730a and wafers 1, 2, 6, and 8 to a second subsystem 730b, and after the wafer lot exits third fabrication equipment 730, the wafer lot may enter a fourth fabrication equipment 740, where a wafer loader 740s shuffles the wafers according to wafer sequence 4 and sends wafers 8, 7, 3, and 1 to a first subsystem 740a and wafers 2, 4, 5, and 6 to a second subsystem 740b. The wafer lot may enter additional fabrication equipment(s) and be further processed in the order specified by corresponding wafer sequence(s) in the exemplary wafer sequence set. Moreover, wafer processing unit 420 may be configured to cycle through different sets of wafer sequences as multiple wafer lots pass through the fabrication equipments to minimize chance correlation between multiple sequences in non-cyclical two pattern models.

One of ordinary skill in the art will appreciate that wafer processing unit 420 depicted in FIG. 7 represents an exemplary wafer processing unit and may incorporate any number and types of fabrication equipments for wafer processing, and that the wafer inspection unit may incorporate any number and types of inspection equipment and may be configured to inspect the wafers at various points during fabrication. One of ordinary skill in the art will also appreciate that the systems and methods disclosed herein may be implemented in various environments. Such environments and related applications may be specially constructed for performing the various processes and operations according to various embodiments of the invention or they may include a general-purpose computer or computing platform selectively activated or reconfigured by code to provide the necessary functionality. The systems and methods disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and processes.

The systems and methods disclosed herein may be implemented as a computer program product, such as a computer program tangibly embodied in an information storage medium, e.g., in a machine readable storage device for execution by or to control the operation of data processing apparatus, e.g., a programmable processor, a computer, or multiple computers. Exemplary machine readable storage devices include conventional computer system RAM (random access memory), ROM (read-only memory), EPROM (erasable, programmable ROM), EEPROM (electrically erasable, programmable ROM), and magnetic or optical disks or tapes. A computer program may be written in any form of processing language, including compiled or interpreted languages, and it can be deployed in any form, include as a standalone program or as a module, component, subroutine, or other unit suitable for use in a computing environment. A computer program can be deployed to be executed on one computer or on multiple computers at one site or distributed across multiple sites and interconnected by a communication network.

The foregoing descriptions of the invention have been presented for purposes of illustration and description. They are not exhaustive and do not limit the invention to the precise form disclosed. In particular, although the method has been described by examples, the steps of the method may be performed in a different order than illustrated or simultaneously. Other embodiments of the present teaching will be apparent to those skilled in the art from consideration of the specification and practice of the exemplary embodiments disclosed herein. It is intended that the specification and examples be considered as exemplary only, with a true scope and spirit of the invention being indicated by the following claims.

What is claimed is:

1. A method of sequencing wafer processing order to minimize sequence correlation in a cyclical two pattern model, the method comprising:

generating a first sequence of wafer identifiers for specifying an order by which a first equipment processes wafers of a first wafer lot, wherein the first wafer lot has a predetermined number of slots and the first equipment includes a first subsystem for processing wafers in odd-numbered slots of the first wafer lot and a second subsystem for processing wafers in even-numbered slots of the first wafer lot;

indexing the first sequence into a set of sequences, wherein the set contains sequences of wafer identifiers for select slots selected from one of the even-numbered slots and the odd-numbered slots;

generating and indexing one or more downstream sequences of the wafer identifiers for specifying an order by which to process the wafers of the first wafer lot in one or more corresponding equipments downstream from the first equipment, wherein each of the generated sequences contains exactly a required number of wafer identifiers that match the wafer identifiers in every sequence previously indexed in the set; and processing the first wafer lot in one of the first and second subsystems of the first equipment in an order based on a first sequence indexed in the set of sequences.

2. The method of claim 1, wherein the required number of matched wafer identifiers is in an inclusive range from one to half of the sequence size of the first sequence.

3. The method of claim 1, wherein generating and indexing one or more downstream sequences further comprises:

generating and indexing a second sequence of the wafer identifiers based on the first sequence by exchanging a preset number of the wafer identifiers in the even-numbered slots with the preset number of the wafer identifiers in the odd-numbered slots.

4. The method of claim 3, wherein the preset number is in an inclusive range from one to half of the sequence size of the first sequence.

5. The method of claim 3, wherein generating a second sequence of wafer identifiers further comprises:

inferring a sequence of wafer identifiers for the slots that are not in the select slots.

6. The method of claim 5, further comprising:
randomizing the inferred sequence of wafer identifiers.

7. The method of claim 3, further comprising:

processing the first wafer lot in one of first and second subsystems of a second equipment in an order based on the second sequence indexed in the set of sequences, wherein the first subsystem of the second equipment processes wafers in odd-numbered slots of the first wafer lot and the second subsystem of the second equipment processes wafers in even-numbered slots of the first wafer lot;

the second equipment is downstream from the first equipment; and the second sequence is different from the first sequence.

8. The method of claim 7, further comprising:
generating an inspection result based on an inspection of the wafers in the first wafer lot subsequent to processing by the second equipment; and determining a faulty subsystem based on the inspection result and the first and second sequences.

9. The method of claim 7, further comprising:

generating wafer tracking data based on a wafer processing order during the processing of the first wafer lot in the first and second equipments;

generating an inspection result based on an inspection of the wafers in the first wafer lot subsequent to processing by the second equipment; and determining a faulty subsystem based on the inspection result and the wafer tracking data.

10. A system for sequencing wafer processing order to minimize sequence correlation in a cyclical two pattern model, comprising:

a communication channel configured to provide communication services;

a wafer sequence generator coupled to the communication channel, wherein the wafer sequence generator is configured to:

generate a first sequence of wafer identifiers for specifying an order by which a first equipment processes wafers of a first wafer lot, wherein the first wafer lot has a predetermined number of slots and the first equipment includes a first subsystem for processing wafers in odd-numbered slots of the first wafer lot and a second subsystem for processing wafers in even-numbered slots of the first wafer lot;

index the first sequence into a set of sequences, wherein the set contains sequences of wafer identifiers for select slots selected from one of the even-numbered slots and the odd-numbered slots; and generate and index one or more downstream sequences of the wafer identifiers for specifying an order by which to process the wafers of the first wafer lot in one or more corresponding equipments downstream from the first equipment, wherein each of the generated sequences contains exactly a required number of wafer identifiers that match the wafer identifiers in every sequence previously indexed in the set; and a wafer processing unit coupled to the communication channel, wherein the wafer processing unit is configured to process the first wafer lot in one of the first and second subsystems of the first equipment in an order based on a first sequence indexed in the set of sequences.

11. The system of claim 10, wherein the required number of matched wafer identifiers is in an inclusive range from one to half of the sequence size of the first sequence.

12. The system of claim 10, wherein the wafer sequence generator is further configured to:

generate and index a second sequence based on the first sequence by exchanging a preset number of the wafer identifiers in the even-numbered slots with the preset number of the wafer identifiers in the odd-numbered slots, wherein the second sequence is one of the downstream sequences.

13. The system of claim 12, wherein the preset number is in an inclusive range from one to half of the sequence size of the first sequence.

14. The system of claim 12, further comprising:

processing the first wafer lot in one of first and second subsystems of a second equipment in an order based on the second sequence indexed in the set of sequences, wherein the first subsystem of the second equipment processes wafers in odd-numbered slots of the first wafer lot and the second subsystem of the second equipment processes wafers in even-numbered slots of the first wafer lot;

the second equipment is downstream from the first equipment; and the second sequence is different from the first sequence.

15. The system of claim 14, further comprising:

generating an inspection result based on an inspection of the wafers in the first wafer lot subsequent to processing by the second equipment; and determining a faulty subsystem based on the inspection result and the first and second sequences.

16. A computer-readable medium containing instructions for performing a method of sequencing wafer processing order to minimize sequence correlation in a cyclical two pattern model, the method comprising:

generating a first sequence of wafer identifiers for specifying an order by which a first equipment processes wafers of a first wafer lot, wherein the first wafer lot has a predetermined number of slots and the first equipment includes a first subsystem for processing wafers in odd-numbered slots of the first wafer lot and a second subsystem for processing wafers in even-numbered slots of the first wafer lot, indexing the first sequence into a set of sequences, wherein the set contains sequences of wafer identifiers for select slots selected from one of the even-numbered slots and the odd-numbered slots;

generating and indexing one or more downstream sequences of the wafer identifiers for specifying an order by which to process the wafers of the first wafer lot in one or more corresponding equipments downstream from the first equipment, wherein each of the generated sequences contains exactly a required number of wafer identifiers that match the wafer identifiers in every sequence previously indexed in the set; and processing the first wafer lot in one of the first and second subsystems of the first equipment in an order based on a first sequence indexed in the set of sequences.

17. The computer-readable medium of claim 16, wherein the required number of matched wafer identifiers is in an inclusive range from one to half of the sequence size of the first sequence.

18. The computer-readable medium of claim 16, wherein the method further comprises:

generating and indexing a second sequence of the wafer identifiers based on the first sequence by exchanging a preset number of the wafer identifiers in the even-numbered slots with the preset number of the wafer identifiers in the odd-numbered slots, wherein the second sequence is one of the downstream sequences.

19. The computer-readable medium of claim 18, wherein the preset number is in an inclusive range from one to half of the sequence size of the first sequence.

20. The computer-readable medium of claim 18, wherein the method further comprises:

processing the first wafer lot in one of first and second subsystems of a second equipment in an order based on the second sequence indexed in the set of sequences, wherein the first subsystem of the second equipment processes wafers in odd-numbered slots of the first wafer lot and the second subsystem of the second equipment processes wafers in even-numbered slots of the first wafer lot;

generating an inspection result based on an inspection of the wafers in the first wafer lot subsequent to processing by the second equipment, wherein the second equipment is downstream from the first equipment; and determining a faulty subsystem based on the inspection result and the first and second sequences.

* * * * *